US012496072B2

(12) United States Patent
Alspaugh

(10) Patent No.: US 12,496,072 B2
(45) Date of Patent: Dec. 16, 2025

(54) MULTI-MODAL PATIENT-SPECIFIC SURGICAL GUIDES

(71) Applicant: WRIGHT MEDICAL TECHNOLOGY, INC., Memphis, TN (US)

(72) Inventor: Julia C. Alspaugh, Memphis, TN (US)

(73) Assignee: WRIGHT MEDICAL TECHNOLOGY, INC., Memphis, TN (US)

(*) Notice: Subject to any disclaimer, the term of this patent is extended or adjusted under 35 U.S.C. 154(b) by 315 days.

(21) Appl. No.: 17/660,931

(22) Filed: Apr. 27, 2022

(65) Prior Publication Data

US 2022/0370083 A1 Nov. 24, 2022

Related U.S. Application Data

(60) Provisional application No. 63/223,224, filed on Jul. 19, 2021, provisional application No. 63/201,950, filed on May 20, 2021.

(51) Int. Cl.
*A61B 17/17* (2006.01)
*A61B 17/00* (2006.01)
*A61B 17/56* (2006.01)
*A61B 90/00* (2016.01)

(52) U.S. Cl.
CPC ...... *A61B 17/1703* (2013.01); *A61B 17/1775* (2016.11); *A61B 2017/00526* (2013.01); *A61B 2017/568* (2013.01); *A61B 2090/3966* (2016.02)

(58) Field of Classification Search
CPC ........... A61B 17/1703; A61B 17/1775; A61B 2017/00526; A61B 2017/568; A61B 2090/3966
See application file for complete search history.

(56) References Cited

U.S. PATENT DOCUMENTS

| 9,089,342 | B2 | 7/2015 | Carroll et al. |
| 9,402,640 | B2 | 8/2016 | Reynolds et al. |
| 2009/0087276 | A1 | 4/2009 | Rose |
| 2012/0317080 | A1 | 12/2012 | Van Lierde et al. |

(Continued)

FOREIGN PATENT DOCUMENTS

EP 2742878 B1 2/2017

OTHER PUBLICATIONS

European Search Report issued in connection with European Patent Application No. 22170782.1, Feb. 8, 2023, 12 pages.

*Primary Examiner* — Sameh R Boles
(74) *Attorney, Agent, or Firm* — DUANE MORRIS LLP

(57) ABSTRACT

A surgical device includes a first body component including at least one insert embedded therein and a second body component including a patient-specific surface. The first body component includes a first material and the at least one insert includes a second material. The first body component defines at least one first hole and the second body component defines at least one second hole. The second body component is configured to be coupled to the first body component such that the at least one first hole and the at least one second hole are aligned when the first body component is coupled to the second body component to define at least one continuous fixation hole sized and configured to receive an elongate fixation device at a predetermined location.

17 Claims, 13 Drawing Sheets

(56) References Cited

U.S. PATENT DOCUMENTS

| | | |
|---|---|---|
| 2014/0257304 A1 | 9/2014 | Eash |
| 2015/0142000 A1* | 5/2015 | Seedhom ............... A61B 34/10 606/87 |
| 2019/0117237 A1 | 4/2019 | White et al. |
| 2020/0138519 A1* | 5/2020 | Frey ................... A61B 17/7071 |

* cited by examiner

MULTI-MODAL PATIENT-SPECIFIC SURGICAL GUIDES

CROSS-REFERENCE TO RELATED APPLICATIONS

This application claims priority to U.S. Provisional Application No. 63/223,224, filed on Jul. 19, 2021 and U.S. Provisional Application No. 63/201,950, filed on May 20, 2021, and entitled "SURGICAL GUIDES AND METHODS OF MANUFACTURE AND USE" by reference in its entireties.

BACKGROUND

Joint replacement surgeries are complicated and time consuming. Any steps that can be removed or combined will lead to a faster surgical time, increased customer satisfaction, and reduced infection risk for the patient. Joint replacement surgery with patient-specific instruments (e.g., using pre-operative planning and/or 3D printing capabilities to use the patient's anatomy as a way to align instruments precisely) removes alignment steps. However patient-specific instruments are manufactured out of plastic, limiting the type and number of operations that may be performed. For example, currently only pinning is done through patient-specific instruments.

To avoid plastic debris creation, which can lead to poor patient outcomes, drilling, cutting, reaming, and other similar operations is currently completed in subsequent steps and using one or more separate reusable instrument. In order to use the additional instruments, the patient-specific instrument must be removed and the additional instruments installed. Removal and installation of additional instruments creates additional risks of misalignment, injury during coupling of the instruments, or other complications.

SUMMARY

In various embodiments, a surgical device is disclosed. The surgical device includes a first body component including at least one insert embedded therein and a second body component including a patient-specific surface. The first body component includes a first material and the at least one insert includes a second material. The first body component defines at least one first hole and the second body component defines at least one second hole. The second body component is configured to be coupled to the first body component such that the at least one first hole and the at least one second hole are aligned when the first body component is coupled to the second body component to define at least one continuous fixation hole sized and configured to receive an elongate fixation device at a predetermined location.

In various embodiments, a surgical device is disclosed. The surgical device includes a first body component including at least one first insert embedded and at least one second insert embedded therein and a second body component including a patient-specific surface. The first body component includes a first material and each of the at least one first insert and the at least one second insert includes a second material. The second body component is configured to be coupled to the first body component. The at least one first insert defines at least a portion of a tool path extending from an outer surface of the first body component to the patient-specific surface of the second body component and the at least one second insert is encapsulated within the first body component.

In various embodiments, a surgical device is disclosed. The surgical device includes a first body component including at least one insert embedded therein and a second body component including a patient-specific surface. The first body component includes a plastic material and the at least one insert includes a metal material. The first body component defines at least one first hole. The second body component defines at least one second hole and is configured to be coupled to the first body component such that the at least one first hole and the at least one second hole are aligned when the first body component is coupled to the second body component to define at least one continuous fixation hole sized and configured to receive an elongate fixation device at a predetermined location. The first body component is formed by an injection molding process and the second body component is formed by a 3D printing process

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

Figure 1:
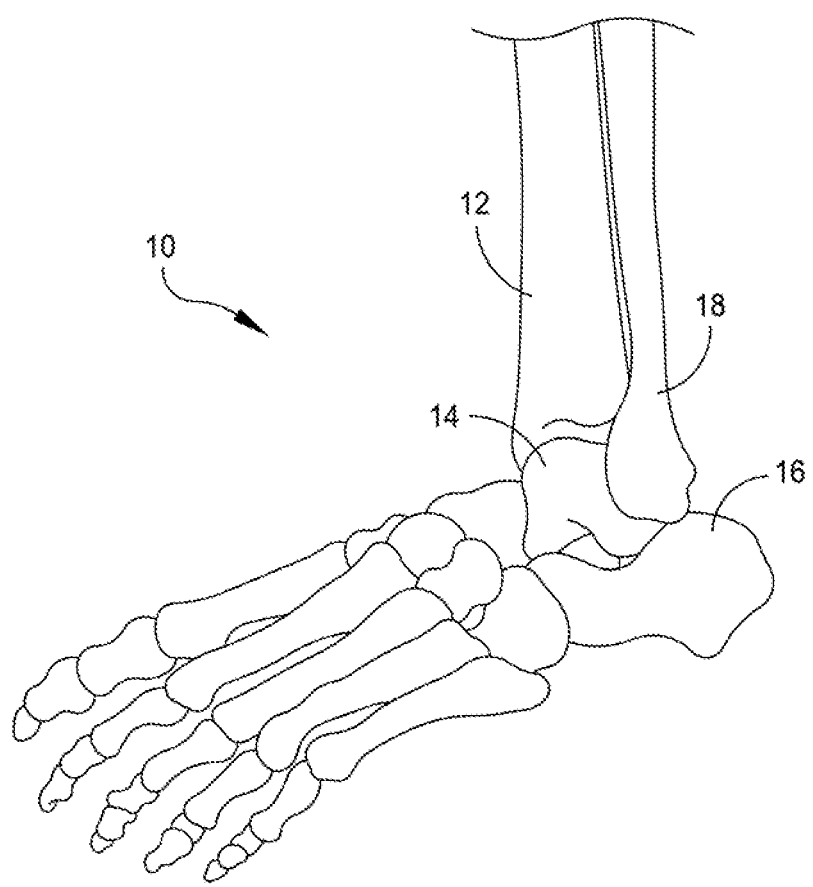
FIG. 1 illustrates one example of a human ankle and foot.

The description of the preferred embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. In this description, relative terms such as "horizontal," "vertical," "up," "down," "top," "bottom," as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both moveable or rigid attachments or relationships, unless expressly described otherwise. The term "operatively coupled" is such an attachment, coupling, or connection that allows the pertinent structures to operate as intended by virtue of that relationship.

As used herein, the term "substantially" denotes elements having a recited relationship (e.g., parallel, perpendicular, aligned, etc.) within acceptable manufacturing tolerances. For example, as used herein, the term "substantially parallel" is used to denote elements that are parallel or that vary from a parallel arrangement within an acceptable margin of error, such as +/−5°, although it will be recognized that greater and/or lesser deviations can exist based on manufacturing processes and/or other manufacturing requirements.

In various embodiments, a system and method for performing surgical operations using 3D-printed patient-specific guides including one or more metal inserts, are disclosed. In some embodiments, a patient-specific guide includes a body formed of a first material. The body includes at least one patient-specific surface configured to match an anatomical structure of a patient. The body includes one or more metal inserts incorporated therein. The one or more metal inserts are positioned prior to and/or during formation of the body such that the metal inserts are positioned at predetermined locations and/or angles with respect to the body and/or the patient-specific surface. In various embodiments, the metal inserts may include, but are not limited to, drill sleeves (e.g., cannulated cylinders), cutting sleeves (e.g., hollow oval prisms or other suitable shapes), pins, BBs, and/or any other suitable metal insert.

The disclosed systems and methods utilize custom manufactured surgical instruments, guides, and fixtures that are based upon a patient's anatomy as determined by a computer tomography scanner (CT), magnetic resonance imaging machine (MRI), or other medical imaging technology. These disclosed systems are derived from image data acquired through the medical imaging as taught by the systems and methods disclosed in U.S. Pat. No. 5,768,134 issued to Swaelens et al., commonly assigned U.S. Pat. No. 9,017,334 issued to Carroll, et al., commonly assigned U.S. Pat. No. 9,113,914 issued to Carroll, et al., and commonly assigned U.S. Pat. No. 10,413,308 issued to Stemniski, et al., the entirety of which are all incorporated by reference herein.

FIG. 1 illustrates one example of a patient's ankle joint 10 comprising a tibia 12, a talus 14, a calcaneus 16, and a fibula 18. The ankle joint 10 illustrated in FIG. 1 may also include a foreign object disposed between tibia 12 and talus 14 (not shown). The foreign object may include, but is not limited to, bone cement, a bone graft, or a previously installed orthopedic implant. For example, in some embodiments, a foreign object includes one or more of a tibial component, talar component, stem component, plate, screw, or other component of an orthopedic prosthesis. Further, while the systems and methods disclosed herein are described with respect to an ankle joint 10, one of ordinary skill in the art will understand that the disclosed systems and methods can be used in other joints including, but not limited to, a hip, knee, shoulder, elbow, and wrist, to identify only a few possible joints. In some embodiments, ankle joint 10, or the joint of interest, including any foreign objects, is imaged using a medical imaging technology including, but not limited to, CT and MRI, to identify only a couple of possible technologies. The obtained image data is converted to a 3D model of the ankle 10, including any foreign objects, in accordance with the methods known in the art.

Figure 2:
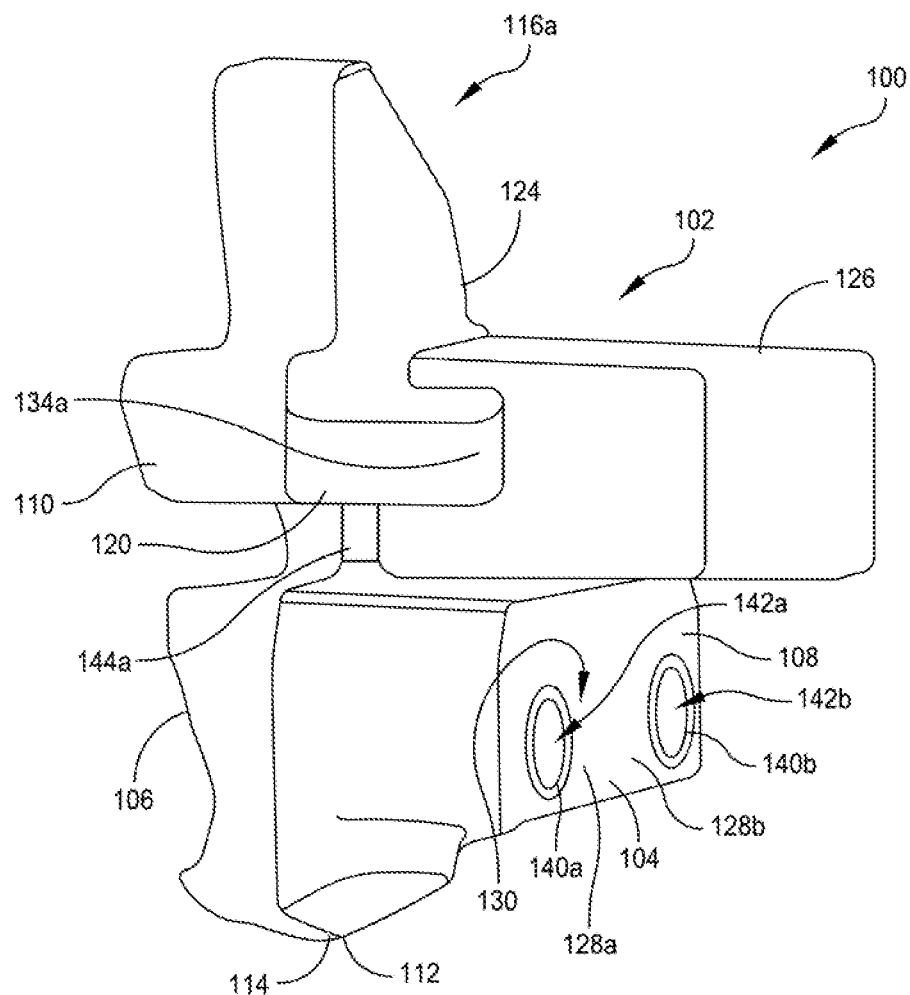
FIG. 2 illustrates a front isometric view of a surgical locator device including at least one metal insert, in accordance with some embodiments.
Figure 3:
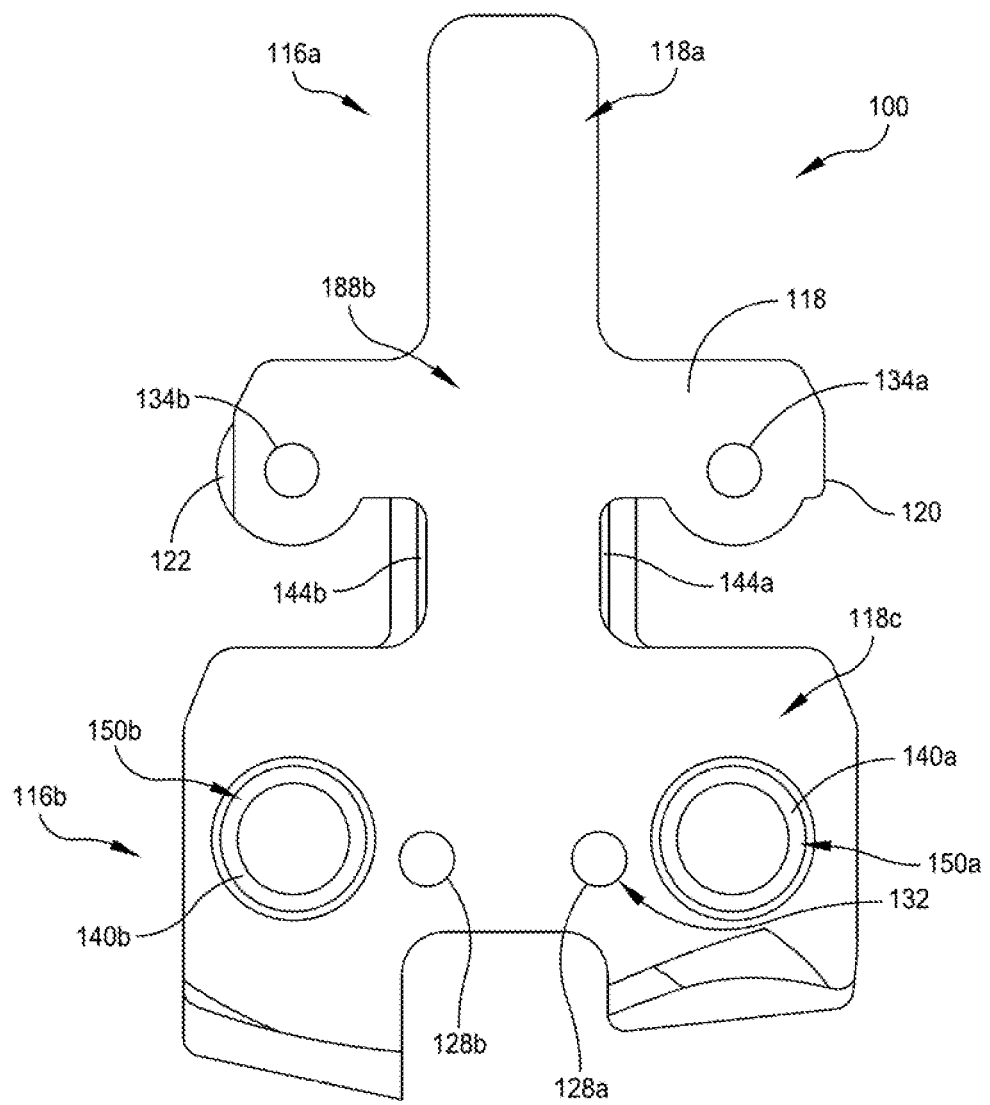
FIG. 3 illustrates a plan view of the surgical locator device of FIG. 1, in accordance with some embodiments.
Figure 4:
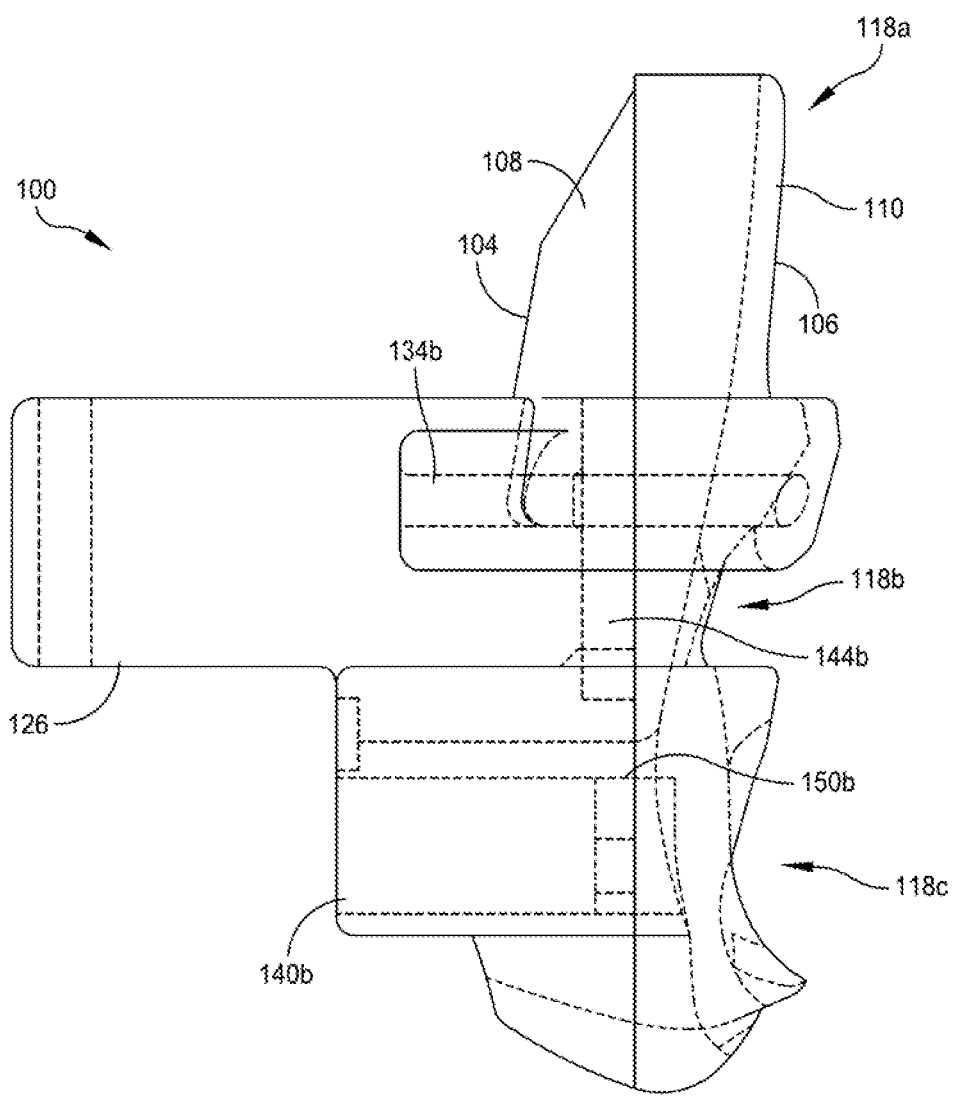
FIG. 4 illustrates a side view of the surgical locator device of FIG. 1, in accordance with some embodiments.

FIGS. 2-4 illustrate one embodiment of a surgical locator device 100, in accordance with some embodiments. The surgical locator device 100 includes a body 102 extending between a first surface 104 and a second surface 106. In some embodiments, the body 102 includes a first body component 108 and a second body component 110. The first body component 108 includes a portion of the body 102 extending from the first surface 104 to a first planar surface 112 and the second body component 110 includes a portion of the body 102 extending from a second planar surface 114 to the second surface 106. The first and second planar surfaces 112, 114 are positioned in an abutting relationship. The first body component 108 may be releasably coupled to the second body component 110, permanently coupled to the second body component 110, and/or positioned in an unfixed abutting relationship with respect to the second body component 110.

In some embodiments, the first surface 104 includes a surface configured to be engaged or manipulated by a user and the second surface 106 includes a patient-specific surface. As shown in FIG. 3, the second surface 106 (e.g., the patient-engaging surface) includes a surface topography 118 configured to match one or more anatomical structures of a patient. The surface topography 118 includes one or more contact surfaces that are designed to be complementary to the prominences and concavities of joint 10, including the surface features of tibia 12, talus 16, and/or a foreign object. For example and as best seen in FIG. 3, a superior portion 116a of the second surface 106 has a first surface topography 118a that is complementary to a distal portion of tibia 12 and, in some embodiments, a second surface topography 118b that is complementary to a portion of a foreign object. Similarly, an inferior portion 116b of the second surface 106 has a third surface topography 118c that is complementary to a portion of a talar dome, a proximal portion of talus, and/or a portion of a foreign object.

In some embodiments, a superior portion 116a of the first body component 108 includes a pair of arms 120, 122 that extend away from a base 124 disposed between arms 120, 122, as best seen in FIG. 4. The base 124 includes an outwardly extending tab 126. The outwardly extending tab 126 may include one or more holes extending therethrough in a superior-inferior direction. The holes may be disposed in one or more planes and may be sized and configured to receive a k-wire, pin, or other elongate object therethrough.

In some embodiments, the body 102 defines a plurality of holes that extend in an anterior-posterior direction. For example, in the illustrated embodiment, a first set of holes 128a, 128b (collectively "holes 128") are disposed adjacent to an inferior edge of the body 102. The location of the holes 128 is configured to guide insertion of a k-wire, pins, and/or other elongate surgical instruments or fixation devices into a predetermined location, such as a talus. In some embodiments, the holes 128 are sized and configured to receive a fixation device therethrough to maintain the body 102 in a fixed position with respect to a surgical site of a patient. One of ordinary skill in the art will understand that the holes 128 defined by body 102 can facilitate the accurate placement of other cutting guides beyond a talar resection guide base. Further, one of ordinary skill in the art will understand that the number of holes may be varied such that fewer than two (e.g., one) or more holes can be provided for guiding an elongate surgical device (e.g., a pin) into a bone and/or foreign object that is then used to guide another surgical instrument, such as a cutting guide, a drill guide, or a cannulated reamer, to list only a few possibilities.

In some embodiments, each of the holes 128 are defined by a first hole portion 130 formed in the first body component 108 and a second hole portion 132 formed in the second body component 110. The first and second hole portions 130, 132 are positioned within each of the respective first and second body components 108, 110 such that the hole portions 130, 132 are aligned to form each of the holes 128 when the first body component 108 is coupled to and/or abutted against the second body component 110. In the illustrated embodiment the first and second hole portions 130, 132 have similar shapes and diameters, although it will be appreciated that the first and second hole portions 130, 132 may have different shapes and/or different diameters, for example, configured to assist in insertion and targeting of one or more elongated surgical instruments through holes 128.

As another example, in some embodiments, a second set of holes 134a, 134b (collectively "holes 134") are positioned superiorly relative to the holes 128, for example, being positioned through a superior portion of the body 102. The location of the holes 128, 134 relative to the body 102 and/or to each other may be determined based on preoperative planning using imaging of the patient such that k-wire(s), pin(s), and/or other elongate surgical instrument(s) is/are inserted at a location that facilitates positioning of one or more metal inserts with respect to one or more anatomical structures, as discussed in greater detail below. Although embodiments are illustrated herein with two sets of holes 128, 134, it will be appreciated that the body 102 may define any number of holes (e.g., single hole, pairs of holes, groups of holes, etc.) in any suitable configuration and/or in any suitable position.

In some embodiments, the first body component 108 and/or the second body component 110 are each formed of one or more predetermined materials. For example, in some embodiments, the first body component 108 and the second body component 110 are each formed from a plastic material by a 3D printing process. As another example, in some embodiments, the first body component 108 is formed from a plastic material by an injection molding process and the second body component 110 is formed from a plastic material by a 3D printing process. It will be appreciated that any suitable process may be used to form either the first body component 108 and/or the second body component 110. The plastic material used to form the first body component 108 and/or the second body component 110 may include any suitable material, such as, for example, polypropylene, polyethylene, polycarbonate, and/or any other suitable plastic.

The first body component 108 may be coupled to the second body component 110 using any suitable coupling mechanism. In some embodiments, the first body component 108 and the second body component 110 are fixedly (e.g., permanently) coupled by one or more fasteners, glues, and/or other coupling mechanisms. For example, the first body component 108 may be coupled to the second body component 110 by a glue or melted plastic material configured to solidify and permanently couple the first body component 108 and the second body component 110. In some embodiments, fasteners, such as screws, pins, nails, clips, staples, etc. may be used, either in addition or alternatively to other coupling mechanisms, to couple the first body component 108 to the second body component 110. In some embodiments, the first body component 108 may be coupled to the second body component 110 by insertion of one or more fasteners during use, as described in greater detail below.

In some embodiments, the body 102 includes one or more first inserts 140a, 140b (collectively "first inserts 140") embedded therein. The first inserts 140 define at least a portion of one or more openings 142a, 142b extending through the body 102. Each of the openings 142a, 142b is sized and configured to receive a surgical instrument therethrough. Suitable surgical instrument may include, but are not limited to, a drill bit, a burr, a saw, a cutting element, etc. The first inserts 140 are configured to prevent contact between the surgical instrument and the body 102. In the illustrated embodiment, the first inserts 140 include sleeves, such as drill sleeves, sized and configured to receive a surgical instrument such as a drill bit, reamer, etc. therethrough. Although specific embodiments are illustrated herein, it will be appreciated that the first inserts 140 may include any suitable insert configured to define an opening 142a, 142b for receiving a surgical tool. For example, in various embodiments, the first inserts 140 may include drill sleeves, cut sleeves, cut guides, etc.

In some embodiments, the body 102 includes one or more second inserts 144a, 144b (collectively "second inserts 144") embedded therein. The second inserts 144 include a radiopaque material and are configured to provide alignment, imaging, and positioning of the body 102 with respect to one or more anatomical structures. The second inserts 144 may be fully encased within one or more of the first body component 108 and/or the second body component 110 and/or may extend partially from a respective body component 108, 110. For example, in the illustrated embodiment, the second inserts 144 are check pins partially embedded within the first body component 108 and configured to be sandwiched between the first body component 108 and the second body component 110 when the body components 108, 110 are coupled together. In the illustrated embodiment, the second inserts 144 include radiopaque check pins, although it will be appreciated that any suitable alignment insert may be used. For example, in various embodiments, the second inserts 144 may include check pins, ball bearings (BB), cylinders, etc.

In some embodiments, the inserts 140, 144 are formed of a material that is different than the material used to form the first body component 108 and/or the second body component 110. For example, in some embodiments, the inserts 140, 144 include a metal material, such as, for example, stainless steel, cobalt-chrome, titanium, nickel-titanium, and/or any other suitable metal. The inserts 140 are permanently coupled to at least one of the first body component 108 or the second body component 110. For example, in some embodiments, the inserts 140, 144 may be positioned within a mold used for injection molding of the first body component 108. As another example, the first body component 108 may be formed with holes sized and configured to receive inserts 140, 144 therein. The inserts 140, 144 may be permanently coupled to the first body component 108 using any suitable coupling mechanism, such as, for example, an adhesive, a press-fit, etc. As yet another example, the inserts 140, 144 may be formed integrally with the first body component 108 during a 3D printing process. The inserts 140, 144 may be completely embedded within and/or may extend partially from the first body component 108.

In some embodiments, the inserts 140, 144 are permanently coupled to and/or formed integrally with the first body component 108 prior to coupling the first body component 108 to the second body component 110. The second body component 110 may define one or more openings configured to be aligned with the inserts 140, 144 when the first body component 108 is coupled to the second body component 110. For example, in the illustrated embodiment, the second body component 110 includes a pair of tool openings 150a, 150b configured to align with the first inserts 140 embedded in the first body component 108. The tool openings 150a, 150b and the openings 142a, 142b defined by the first inserts 140 define a continuous tool path extending from the first surface 104 to the second surface 106 of the body 102.

In the illustrated embodiment, the inserts 140 are fully encased within the first body component 108. A tool inserted through a tool path defined by the openings 142a, 142b and the tool openings 150a, 150b is interfaced with a bone and may be used to perform one or more surgical procedures, such as, for example, drilling, cutting, reaming, etc. The inserts 140 prevent contact between the surgical instrument used for the surgical procedure (e.g., drill bit, cutting element, saw, burr, reamer, etc.) and the material of the first and second body components 108, 110. The inserts 140 prevent accidental contact between the surgical instrument and, for example, the plastic material of the body 102, preventing formation of debris, which may impact patient outcomes and health. Similarly, in some embodiments, the second inserts 144 may be embedded within the first body component 108 such that the second inserts 144 are visible only under medical imaging, such as fluoroscopy.

In some embodiments, the inserts 140, 144 may be formed integrally with the first body component 108 and extend partially into the second body component 110 when the first body component 108 and the second body component 110 are coupled together. For example, in some embodiments, the first inserts 140 may include sleeves, such as drill sleeves, having a portion extending in a posterior direction beyond the planar surface 112 of the first body component 108. The second body component 110 may define a tool opening 150a, 150b sized and configured to receive a posterior portion of each of the first inserts 140 therein such that the first inserts 140 extend partially into the second body component 110.

In some embodiments, the inserts 140, 144 may be formed integrally with the first body component 108 and configured to be positioned in an abutting relationship with the second body component 110 when the first body component 108 is coupled to the second body component 110. For example, in some embodiments, the second inserts 144 are embedded in the first body component 108 such that a surface of each of the second inserts 144 is coplanar with and/or forms a portion of the planar surface 112. When the first body component 108 is coupled to the second body component 110, a surface of each of the second inserts 144 is positioned in an abutting relationship with the planar surface 114 of the second body component 110.

In some embodiments, the first body component 108 may be releasably coupled to the second body component 110 to allow a different first body component to be coupled to the second body component 110 during a surgical procedure. For example, in some embodiments, the surgical locator device 100 may be coupled to the surgical site as illustrated in FIGS. 1-3, i.e., including the illustrated first body component 108. One or more surgical procedures, such as drilling and/or reaming, may be performed through one or more inserts 140 formed in the first body component 108. After performing the one or more surgical procedures, the first body component 108 may be disconnected from the second body component 110 and removed from the surgical site (while leaving the second body component 110 coupled to the surgical site). A different body component, such as first body component 108a discussed below with respect to FIG. 5, may be coupled to the second body component 110 and used to perform one or more additional surgical procedures, such as, for example, a cutting procedure. It will be appreciated that any number of first body components 108 may be coupled to the second body component 110 without disconnecting the second body component 110 from the surgical site.

Figure 5:
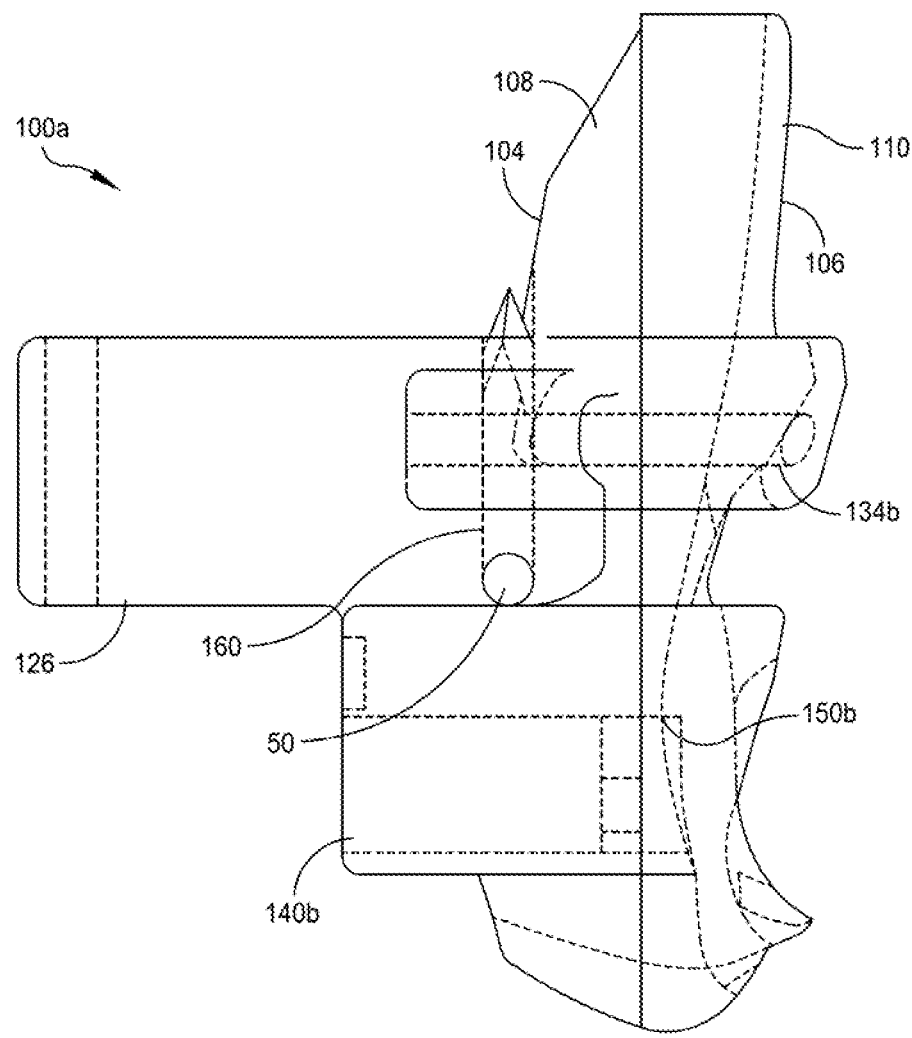
FIG. 5 illustrates a side view of a surgical locator device including an alignment pin, in accordance with some embodiments.

FIG. 5 illustrates one embodiment of a surgical locator device 100a configured to receive a removable alignment device, in accordance with some embodiments. The surgical locator device 100a is similar to the surgical locator device 100 discussed above, and similar description is not repeated herein. The surgical locator device 100a includes a hole 160 extending through the outwardly extending tab 126a. The pin hole 160 extends through the outwardly extending 126 in a substantially inferior-superior direction. As shown in FIG. 5, the hole 160 may extend at an angle with respect to an inferior-superior axis of the surgical locator device 100a. The hole 160 may be positioned at any suitable angle with respect to the inferior-superior axis, such as, for example, any angle substantially between 0° and 90°.

In some embodiments, the hole 160 is sized and configured to receive an alignment device 50 therethrough. The alignment device may include any suitable alignment device, such as, for example, a pin, k-wire, or other elongated surgical device. The alignment device 50 may be inserted into the hole 160 after coupling the first body component 108a to the second body component 110. For example, the alignment device 50 may be inserted pre-operative (i.e., prior to coupling the surgical locator device 100a to a surgical site) and/or intra-operative (i.e., simultaneous with or after coupling the surgical locator device 100a to a surgical site). The alignment device 50 may provide alignment, for example, under fluoroscopy, of the surgical locator device 100a. In other embodiments, the alignment device 50 may be configured to couple one or more additional components to the surgical locator device 100a in a predetermined alignment. Although the illustrated embodiment includes a single hole 160, it will be appreciated that two or more holes may be defined by the first body component 108a. For example, in some embodiments, a plurality of holes may extend in a substantially inferior-superior direction through the outwardly extending tab 126a, each of which is configured to receive an alignment device 50 therethrough.

Figure 6:
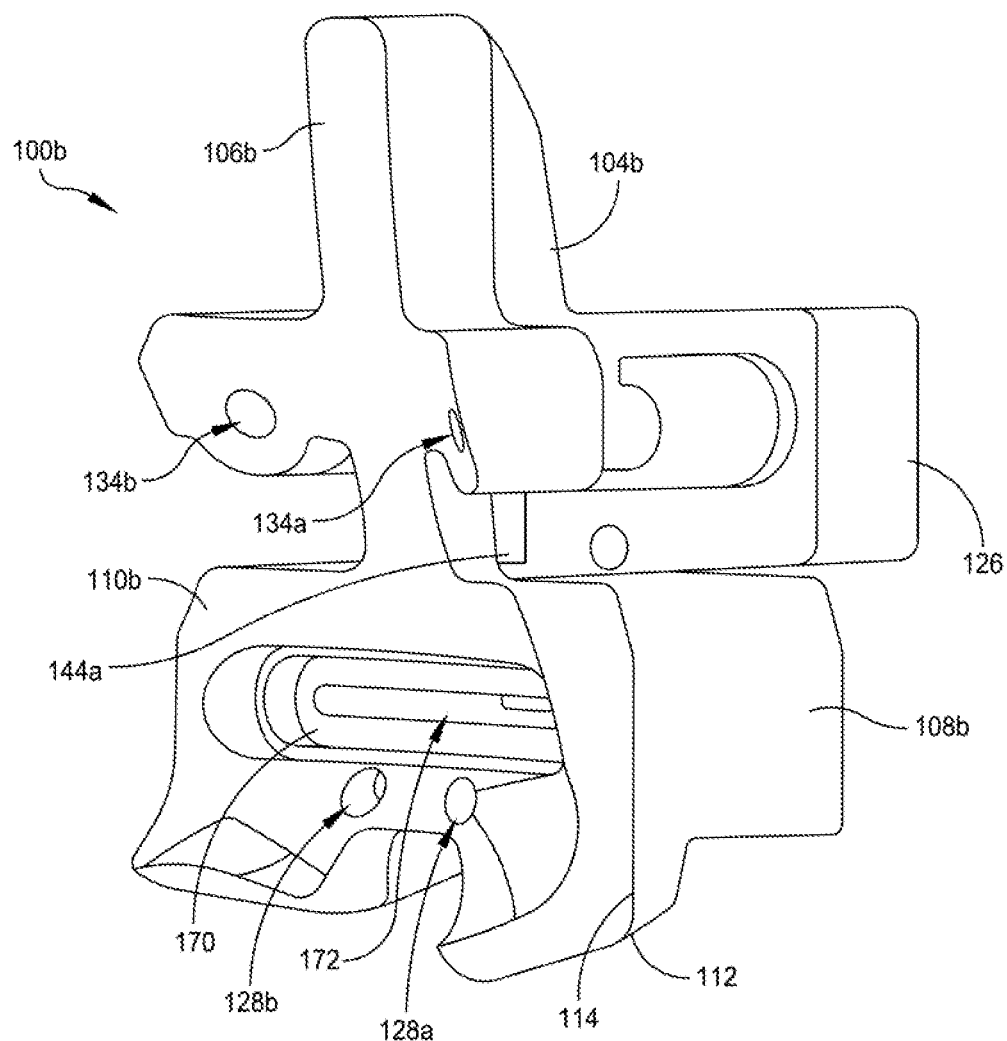
FIG. 6 illustrates a rear isometric view of a surgical locator device including a cutting slot insert, in accordance with some embodiments.
Figure 7:
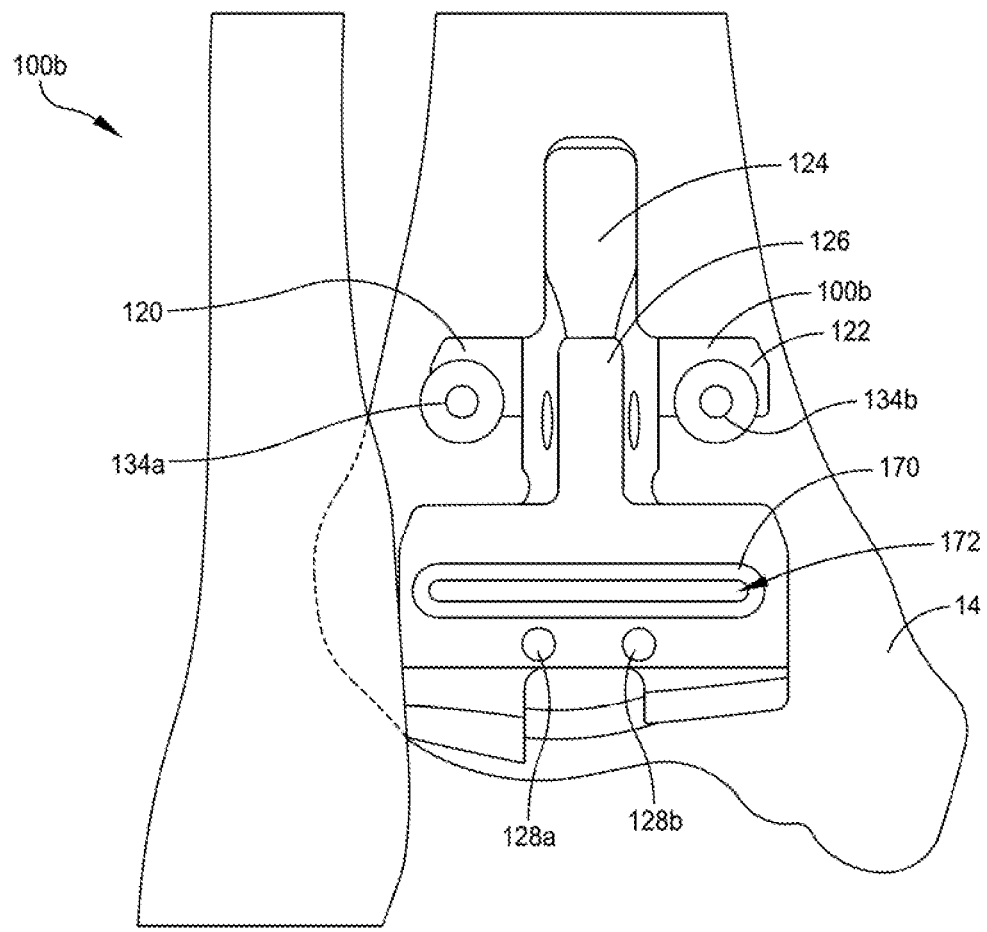
FIG. 7 illustrates the surgical locator device of FIG. 1 positioned at a surgical site, in accordance with some embodiments.

FIGS. 6-7 illustrate one embodiment of a surgical locator device 100b including a cut sleeve 170 embedded therein, in accordance with some embodiments. The surgical locator device 100b is similar to the surgical locator devices 100, 100a discussed above, and similar description is not repeated herein. The surgical locator device 100b includes a first insert in the form of a cut sleeve 170 extending substantially over the width of the first body component 108b. The cut sleeve 170 defines a cutting slot 172 sized and configured to receive a cutting instrument, such as a saw or burr, therethrough. The cutting slot 172 defines a predetermined shape configured to provide a predetermined cutting path to a cutting instrument inserted into the cutting slot 172.

As illustrated in FIG. 6, the first body component 108b and the second body component 110b may each define a portion of a tool path 150c that is co-located with the cutting slot 172 of the cutting sleeve 170. The tool path 150c is configured to offset the material of the first and second body components 108b, 110b the cutting sleeve 170 may be embedded within the first body component 108b such that the inner surfaces 174, 176 of the first and second body components 108b, 110b defining the tool path 150c are offset from the cutting slot 172 to prevent contact between a cutting instrument inserted through the cutting slot 172 and the body components 108b, 110b. Although embodiments are illustrated including a cutting sleeve 170 that terminates anterior of the planar surface 112 of the first body component 108b, it will be appreciated that the cutting sleeve 170 may be configured to extent to and/or beyond the planar surface 112 of the first body component 108b, as discussed above.

As shown in FIG. 7, the cutting slot 172 may be configured to provide a cutting path for removing one or more portions of a bone, such as, for example, a tibia. The cutting slot 172 is aligned with a predetermined portion of a patient's anatomy based on the interface between the second surface 106 (e.g., the patient-specific surface) and one or more anatomical structures. In the illustrated embodiment, the second surface 106 of the body 102 includes a patient-specific topography configured to couple the body 102 to the talus in a single, predetermined arrangement. As discussed in greater detail below, the surgical locator device 100b may be coupled to the surgical site using one or more temporary fixation mechanism, such as, for example, one or more k-wires. After being fixed to the talus, a surgical instrument, such as a cutting edge, burr, drill, etc., may be inserted through the cutting slot 172 to remove or separate a predetermined portion of the talus. Although embodiments are illustrated herein including a cutting slot 172 aligned with a talus, it will be appreciated that the cutting slot 172 can be configured to align with any suitable bone or anatomical structure.

Figure 8:
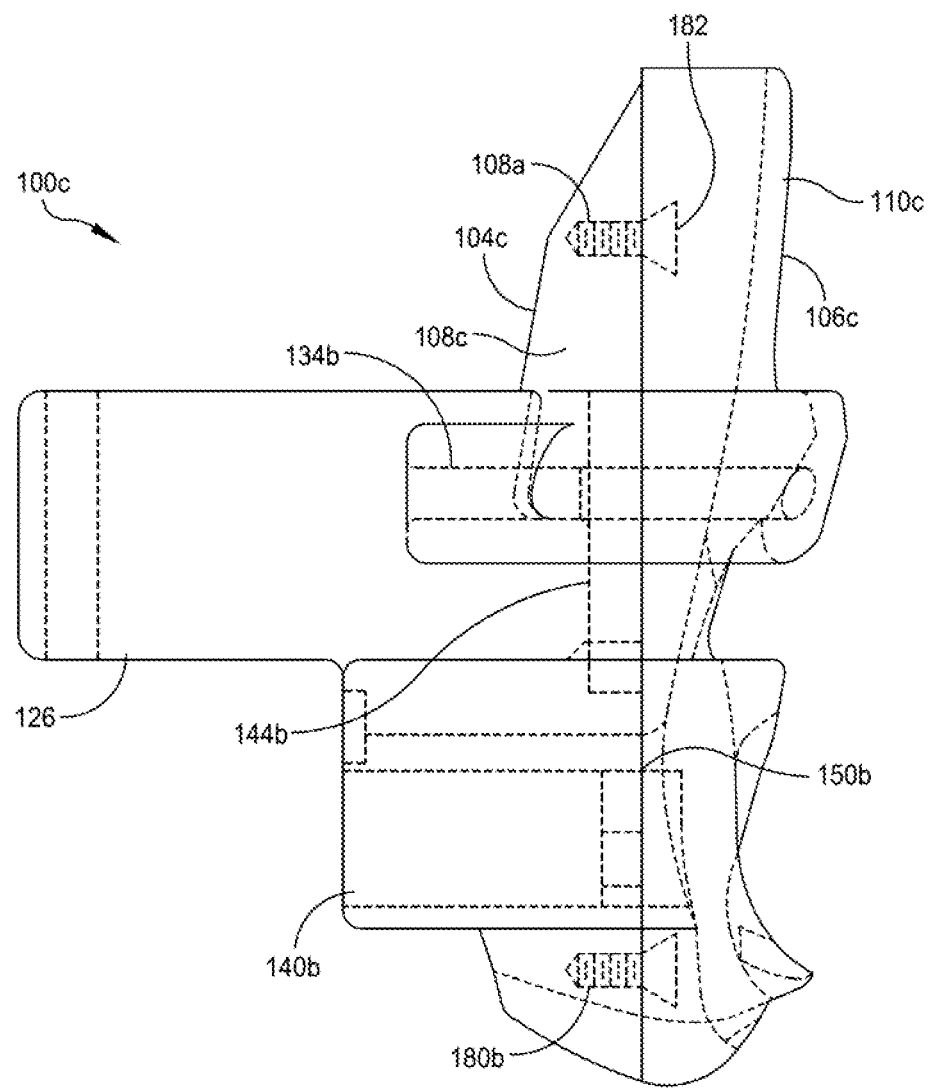
FIG. 8 illustrates a side view of a surgical locator device having a first body component coupled to a second body component by a plurality of fasteners, in accordance with some embodiments.

FIG. 8 illustrates one embodiment of a surgical locator device 100c including plurality of fasteners 180a, 180b coupling the first body component 104c to the second body component 106c, in accordance with some embodiments. The surgical locator device 100c is similar to the surgical locator devices 100, 100a, 100b discussed above, and similar description is not repeated herein. The surgical locator device 100c includes a first fastener 180a and a second fastener 180b coupling the first body component 104c to the second body component 106c. In some embodiments, the fasteners 180a, 180b include a threaded fastener, such as a screw, although it will be appreciated that other suitable fasteners, such as pins, nails, etc. may be used.

In some embodiments, the second body component 110c may include one or more holes extending from the second surface 106c to the second planar surface 114. The holes are sized and configured to receive a portion of a fastener 180a, 180b therethrough. In some embodiments, the holes include a stop or other circumferential ledge configured to interface with a head portion 182 of a fastener 180a, 180b to prevent advancement of the fastener 180a, 180b beyond a predetermined depth.

In some embodiments, the first body component 108c includes one or more holes extending from a first planar surface 112 into the first body component 108c. The one or more holes may be sized and configured to receive a portion of a fastener 180a, 180b therein to couple the first body component 108c to the second body component 110c. For example, in some embodiments, the holes formed in the first body component 108c include an internal thread sized and configured to mate with an external thread formed on a portion of each of the fasteners 180a, 180b. Although specific embodiments are discussed herein, it will be appreciated that the fasteners 180a, 180b may be configured to couple the first body component 108c to the second body component 110c using any suitable coupling mechanism.

Figure 9:
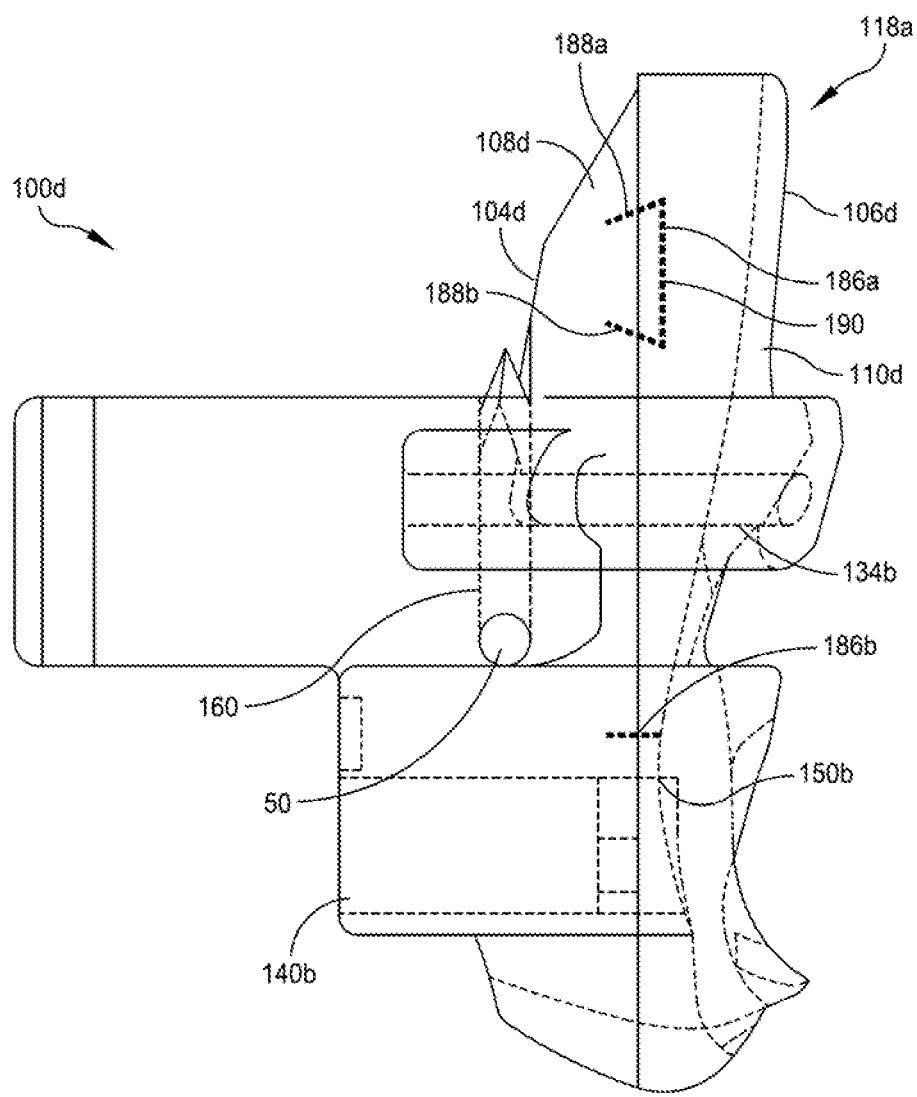
FIG. 9 illustrates a side view of a surgical locator device having a first body component coupled to a second body component by a plurality of clips, in accordance with some embodiments.

FIG. 9 illustrates one embodiment of a surgical locator device 100d including plurality of fasteners coupling the first body component 108d to the second body component 110d, in accordance with some embodiments. The surgical locator device 100d is similar to the surgical locator devices 100, 100a, 100b, 100c discussed above, and similar description is not repeated herein. The surgical locator device 100c includes a first fastener 186a and a second fastener 189b coupling the first body component 104c to the second body component 106c. In some embodiments, the fasteners 186a, 186b include staples, although it will be appreciated that other suitable fasteners, such as spring clips, may be used.

In some embodiments, the second body component 110d may include one or more holes extending from the second surface 106d to the second planar surface 114. The holes are sized and configured to receive a leg portion 188a, 188b of a fastener 186a, 186b therethrough. In some embodiments, the second surface 106d defines one or more slots sized and configured to receive a head portion 190 of a fastener 186a, 186b therein. The second body component 110d is configured to receive each of the fasteners 186a, 186b such that the fasteners 186a, 186b are disposed completely below the second surface 106d and such that a portion of each of the fasteners 186a, 186b extends beyond the second planar surface 114.

In some embodiments, the first body component 108d includes one or more holes extending from a first planar surface 112 into the first body component 108c. The one or more holes may be sized and configured to receive a portion of a fastener 180a, 180b therein to couple the first body component 108c to the second body component 110c. For example, in some embodiments, the holes formed in the first body component 108d include angled holes sized and configured to receive the leg portions 188a, 188b of the fasteners 186a, 186b therein. Although specific embodiments are discussed herein, it will be appreciated that the fasteners 186a, 186b may be configured to couple the first body component 108d to the second body component 110d using any suitable coupling mechanism.

Figure 10:
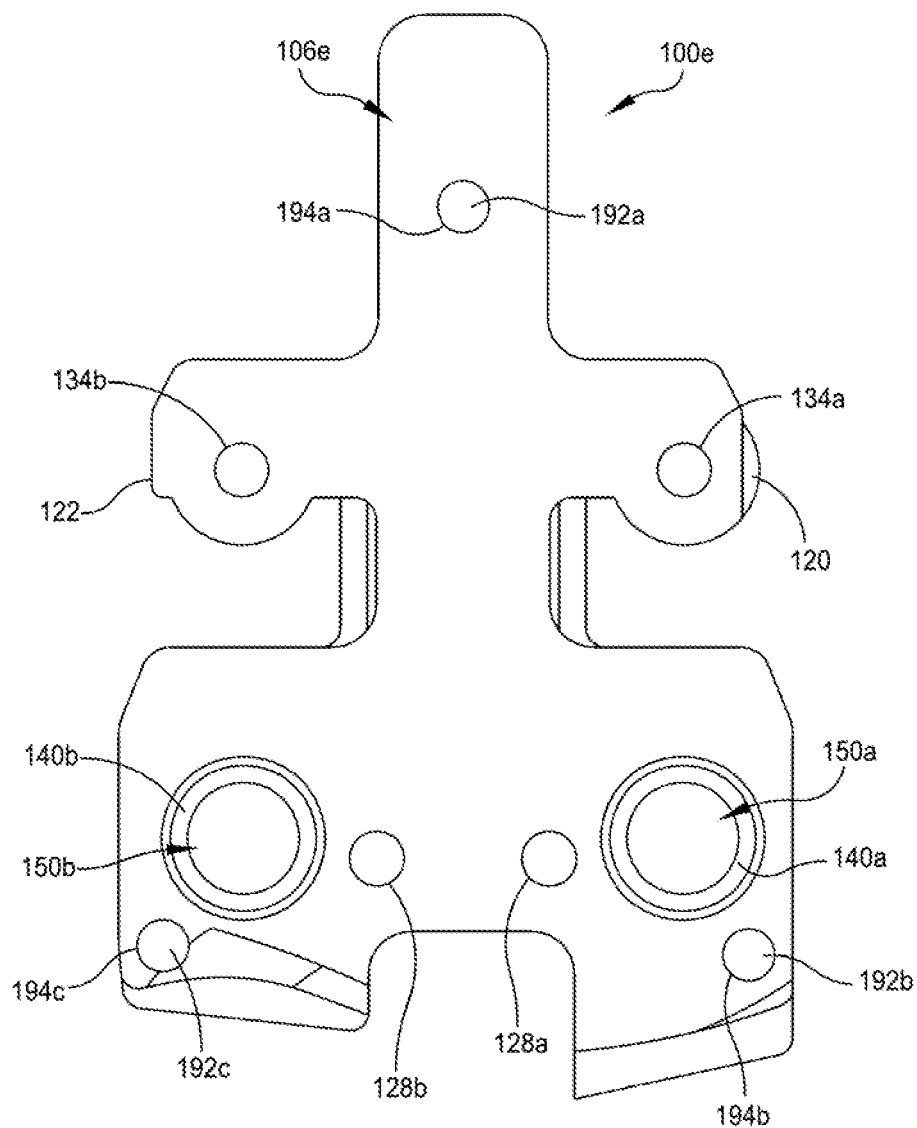
FIG. 10 illustrates a plan view of a surgical locator device including a first portion having a plurality of pins and a second portion defining a plurality of pin holes, in accordance with some embodiments.

FIG. 10 illustrates one embodiment of a surgical locator device 100e including a first body component 108e having one or more coupling elements extending from the first planar surface 112 and a second body component 110e having one or more openings sized and configured to receive the coupling elements therein, in accordance with some embodiments. The surgical locator device 100e is similar to the surgical locator devices 100, 100a, 100b, 100c, 100d discussed above, and similar description is not repeated herein. In some embodiments, the first body component 108e includes one or more coupling elements, such as one or more projections 192a-192c, extending from the first planar surface 112. The coupling elements are configured to align the first body component 108e with a second body component 110e and/or couple the first body component 108e to the second body component 110e.

For example, in some embodiments, the second body component 110e includes a plurality of holes 194a-194c, each sized and configured to receive one of the projections 192a-192c of the first body component 108e therein. In the illustrated embodiment, each of the plurality of holes 194a-194c includes a circular shape configured to match a circular cross-section of the projections 192a-192c, although it will be appreciated that the projections 192a-192c and/or the holes 194a-194c may have any suitable shape configured to provide for insertion of the projections 192a-192c into the holes 194a-194c. In some embodiments, the projections 192a-192c and/or the holes 194a-194c may receive an adhesive or other coupling element thereon configured to couple the first body component 108e to the second body component 110e.

Figure 11:
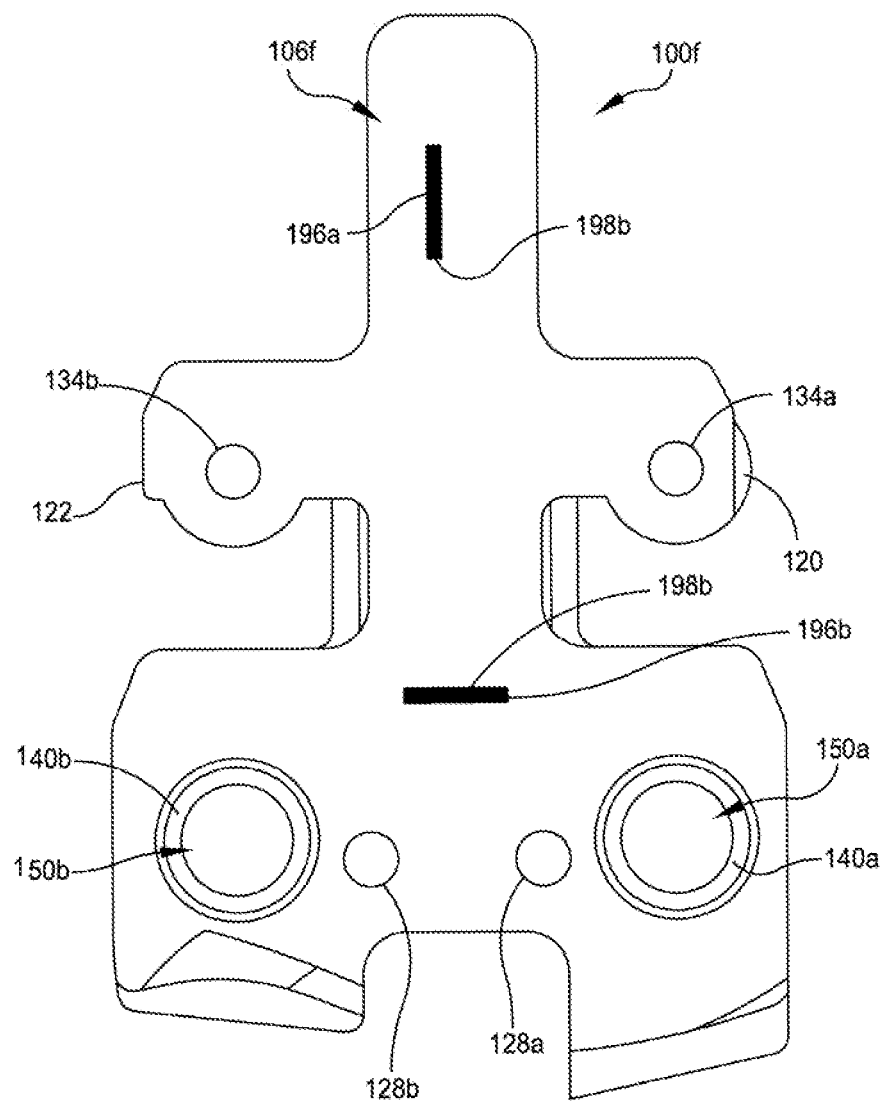
FIG. 11 illustrates a plan view of a surgical locator device including a first portion defining a plurality of tabs and a second portion defining a plurality of slots, in accordance with some embodiments.

FIG. 11 illustrates one embodiment of a surgical locator device 100f including a first body component 108f having one or more coupling elements extending from the first planar surface 112 and a second body component 110f having one or more openings sized and configured to receive the coupling elements therein, in accordance with some embodiments. The surgical locator device 100f is similar to the surgical locator devices 100, 100a, 100b, 100c, 100d, 100e discussed above, and similar description is not repeated herein. The surgical locator device 100f is substantially similar to the surgical locator device 100e, where the circular projections 192a-192c are replaced with elongated projections 196a-196b and the circular holes 194a-194c are replaced with elongated slots 198a-198b.

Figure 12:
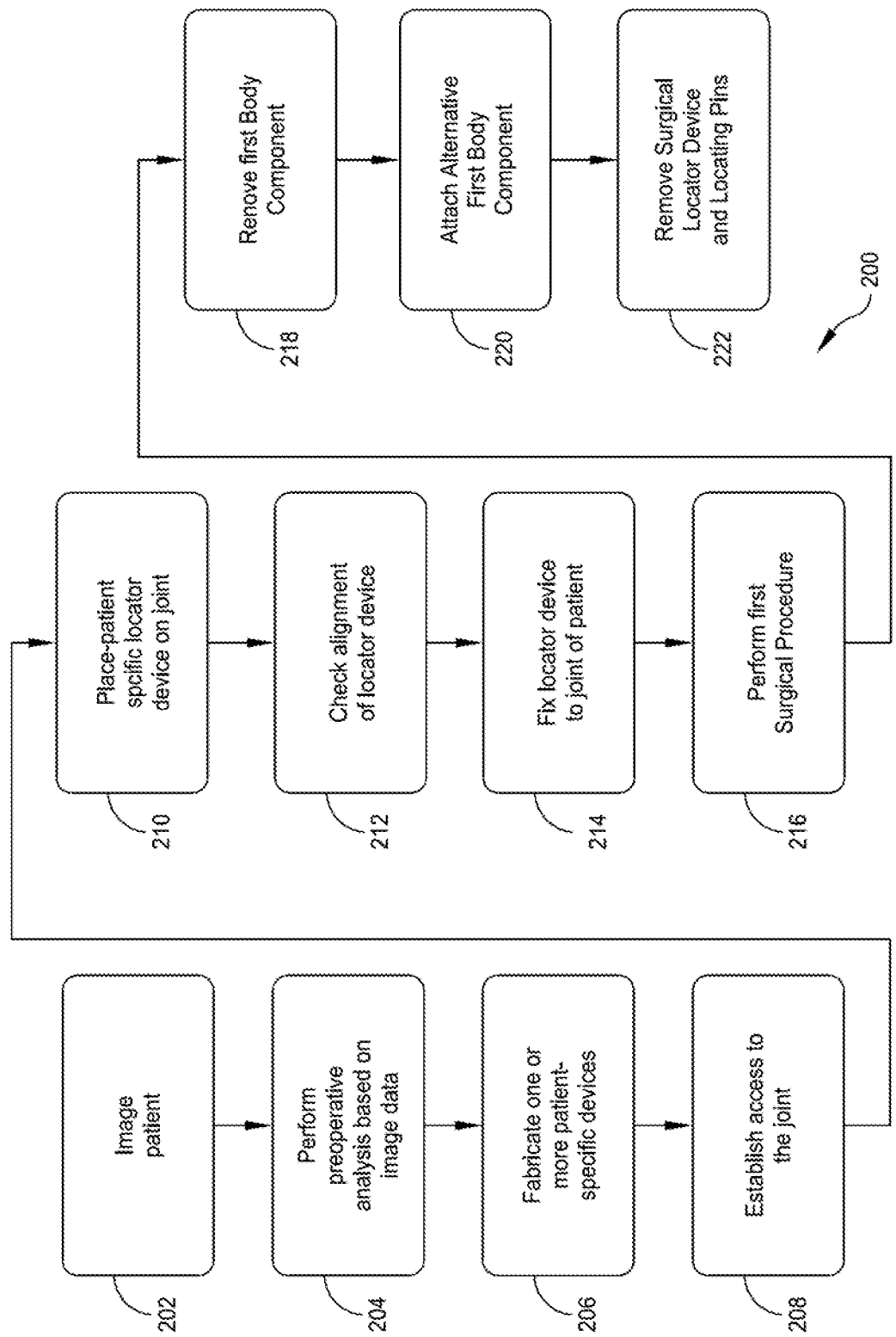
FIG. 12 is a flowchart illustrating a method of using a surgical locator device, in accordance with some embodiments.

The surgical locator devices and systems disclosed herein can be used in a wide variety of surgical methods, including revision surgeries and fusion takedowns to identify only a couple of non-limiting possibilities. One example of a fusion takedown procedure is described now with reference to FIGS. 2-7 and 12-13 in which FIG. 12 is a flow chart of example of a method 200 in accordance with some embodiments. One of ordinary skill in the art will understand that various surgical procedures can be performed using the locator devices disclosed herein and therefore one or more steps of method 200 may be omitted and additional steps also can be performed.

At step 202, the patient is imaged. For example, one or more areas of a patient can be imaged using one or more medical imaging technologies such as x-ray, CT, and/or MRI to list only a few possibilities. In some embodiments, a single joint of the patient is imaged. For example, when the fusion takedown is to be performed on a patient's ankle, one or more images of the patient's ankle can be acquired using medical imaging instrumentation as will be understood by one of ordinary skill in the art.

However, in some embodiments, multiple joints of a patient are imaged in order to gather data concerning the patient's anatomy. For example, in order to be able to determine the anatomical and mechanical axes of the patient's leg, the patient's ankle and at least one other joint, e.g., knee or hip, also will be imaged.

At block 204, the image data is used to perform preoperative analysis of the surgical procedure. For example, the image data is used to generate three-dimensional (3D) renderings of the patient's anatomy, which is then used by a physician to assess the implant site and the develop a surgical plan as described in commonly assigned U.S. Pat. No. 9,113,914 issued to Carroll, et al., which is incorporated by reference herein. The acquired image data not only includes data concerning the patient's anatomy, such as bones and/or cartilage, but the acquired image data also includes data concerning any foreign objects within the patient's body. The geometry and location of foreign objects within the patient's body is used when developing the surgical plan and preoperative analysis. In some embodiments, a foreign object is bone cement used to fuse the ankle joint 10 of the patient. However, one of ordinary skill in the art will understand that the foreign object can be an orthopedic implant and/or any other suitable surgical implant or device.

At block 206, one or more patient-specific surgical devices, such as a surgical locator device 100, are fabricated. In some embodiments, a first body portion 108 of the surgical locator device 100 is fabricated using a first fabrication process, such as, for example, injection molding. During formation of the first body portion 108, one or more inserts 140, 144 are coupled to and/or embedded within the first body portion 108, as discussed above. A second body portion 110 of the surgical locator device 100 may be fabricated using a second fabrication process, such as, for example, stereolithography, selective laser sintering, or 3D printing, to list only a couple of possible examples. The first body portion 108 is coupled to the second body portion 110 using one or more coupling mechanisms, such as, for example, an adhesive. The fabricated surgical locator device 100 will be sterilized and prepared for use during surgery as will be understood by one of ordinary skill in the art.

At block 208, access to the joint is established, such as by making an incision to expose the bony and/or cartilaginous surfaces of the joint. In some embodiments, the incision is made along the anterior of the patient's ankle joint 10 to expose at least the tibia 12, talus 14, and/or a foreign object.

At block 210, with the joint 10 exposed, the patient-engaging surface, e.g., the second surface 106, of the surgical locator device 100 is placed in contact with a bony surface, a cartilaginous surface, and/or in contact with a surface of a foreign object. The position of second surface 106 relative to the surface of joint 10 is adjusted by the surgeon until the surgical locator device 100 "locks" to joint 10. As will be understood by one of ordinary skill in the art, the "locking" of surgical locator device 100 to joint 10 is accomplished by aligning the complementary prominences and concavities of the patient-specific topography 118 of surgical locator device 100 to the corresponding prominences and concavities of the tibia 12, talus 14, and/or a foreign object.

At block 212, the alignment of surgical locator device 100 relative to tibia 12 is checked. For example, in some embodiments, a fluoroscopic check is performed to confirm alignment of the surgical locator device 100 based on one or more inserts 144 embedded within the first body component 108, such as, for example, one or more radiopaque elongate inserts. As another example, in some embodiments, a radiopaque elongate surgical element 50 is inserted into a hole 160 such that the element 50 extends as shown in FIG. 5. In some embodiments, body 102 is pinned to joint 10 prior to performing the fluoroscopic check by inserting a k-wire or pin into each of holes 128, 134 to secure surgical locator device 100 to joint 10 during a fluoroscopic check. The fluoroscopic check is performed once the surgical locator device 100 is locked to the joint 10 by imaging surgical locator device 100 to confirm the alignment relative to tibia 12. The location of surgical alignment device 100 relative to joint 10 can be adjusted intraoperatively by the surgeon depending on the intraoperative fluoro checks. One of ordinary skill in the art will understand that checking the alignment of a surgical locator device relative to an anatomical structure of the patient or with respect to foreign object does not always need to be performed.

At block 214, with the position of locator device 100 relative to joint 10 confirmed, additional k-wires or pins are inserted into the tibia 12 and talus 14 through holes 128, 134, respectively. For example, a pair of k-wires or pins are inserted into talus 14 by being guided by holes 128 to position the k-wires or pins at a specific location in talus 14. Another pair of k-wires or pins are inserted into tibia 12 by being guided by holes 134 at a specific location in tibia 12.

At block 216, a first surgical procedure is performed through one or more tool paths 150a, 150b defined at least partially be one or more inserts 140 embedded in the first body component 108. For example, in one embodiment, one or more holes may be formed in a tibia 14 by inserting a drill, reamer, or other device through the inserts 140 embedded in the first body component 108. The inserts 140 allow insertion of a surgical instrument and prevent contact between the surgical instrument and the inner surface of the first and second body components 108, 110. As another example, in some embodiments, resections are made using a cutting guide 170 embedded in a first body component 108. In the embodiment illustrated in FIGS. 5 and 6, a saw or other cutting guide is inserted into slot 172, which guides a cutting device as bony cuts are made to the tibia 12. In some embodiments, the cutting guide can be configured such that cuts can be made to both the tibia 12 and talus 14.

In some embodiments the resections made using the first cutting guide includes resecting at least a portion of a foreign object. For example, a foreign object may be positioned within the patient such that when a cutting device is guided by a cutting guide the cutting device makes contact with bone and a portion of the foreign object.

At optional block 218, the first body component 108 is disconnected from the second body component 110 and removed from the surgical site. A different first body component, such as first body component 108b illustrated in FIGS. 5 and 6, may be coupled to the second body component 110 to provide for one or more additional surgical procedures. At optional block 220, one or more additional surgical procedures are performed through the different first body component.

At block 222, the surgical locator device 100 and supporting pins are removed from the patient, if applicable. For example, pins can be withdrawn from talus 14, and the pins and surgical locator device 100 are removed from their engagement with talus 14. As will be understood by one of ordinary skill in the art, the resected bone and/or portion of a foreign object also can be removed.

Figure 13:
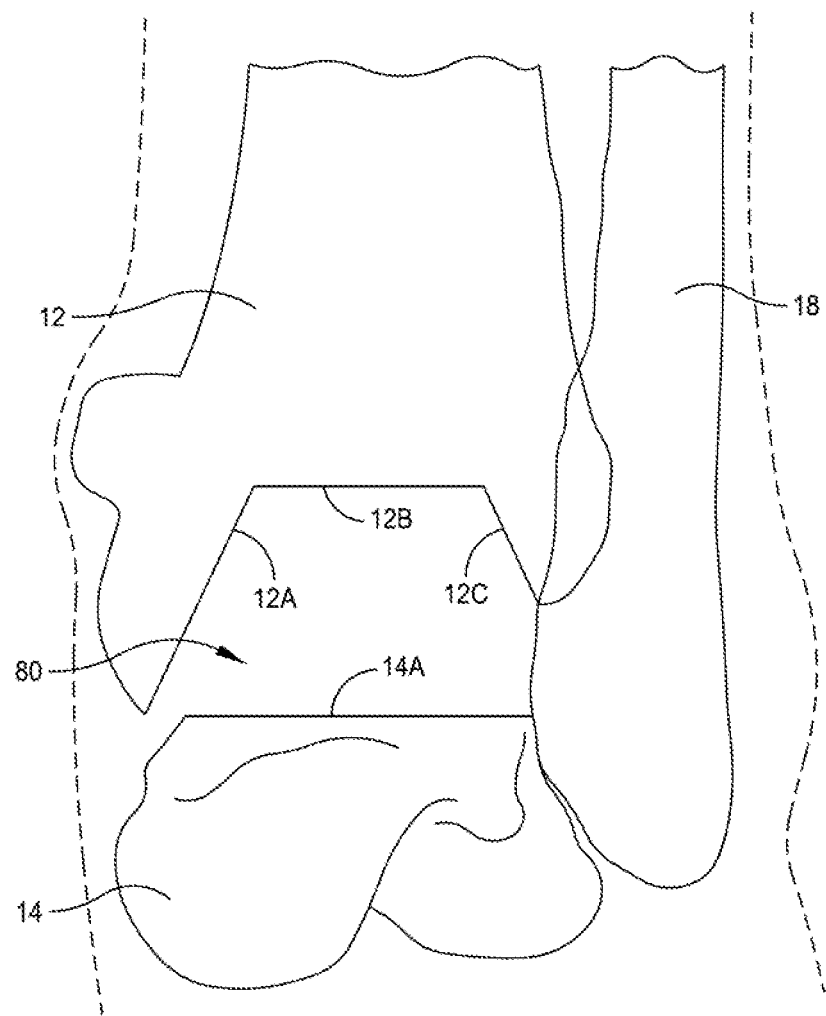
FIG. 13 illustrates a resected bone space created using a surgical locator device, in accordance with some embodiments.

With the resections having been made to the bone and/or a foreign object, a void is provided between the bones of the joint for further preparation of the bones and/or foreign object to receive a prosthesis. For example, FIG. 13 illustrates one example of a resected bone space 80 defined by resected surfaces 12A, 12B, 12C of tibia 12, resected surface 14A of talus 14, and femur 18.

Further surgical steps can be performed to implant a joint prosthesis as will be understood by one of ordinary skill in the art. Examples of such procedures are shown and described in commonly assigned U.S. Pat. Nos. 8,808,297; 8,808,303; and 9,918,724, all of which are incorporated by reference herein in their entireties. These surgical procedures are only a few examples of possible surgical techniques that can be performed using the patient-specific tools described herein.

In some embodiments, a surgical device includes a first body component including at least one insert embedded therein. The first body component comprises a first material and the at least one insert comprises a second material. The first body component defines at least one first hole. The surgical device includes a second body component including a patient-specific surface having a topography complimentary to an imaged joint. The second body component defines at least one second hole. The second body component is configured to be coupled to the first body component. The at least one first hole and the at least one second hole are aligned when the first body component is coupled to the second body component to define at least one continuous fixation hole sized and configured to receive an elongate fixation device at a predetermined location.

In some embodiments, the at least one insert defines at least a portion of a tool path extending from an outer surface of the first body component to the patient-specific surface of the second body component.

In some embodiments, the at least one insert comprises one of a drill guide or a cutting guide.

In some embodiments, the at least one insert comprises a radiopaque alignment element.

In some embodiments, the at least one insert is encapsulated within the first body component.

In some embodiments, the first body component defines a first planar surface and the second body component defines a second planar surface. The first planar surface is configured to abut the second planar surface when the first body component is coupled to the second body component.

In some embodiments, the first body component includes at least one coupling element extending from the first planar surface and the second body component defines at least one opening in the second planar surface sized and configured to receive the at least one coupling element therein.

In some embodiments, the first body component is coupled to the second body component by one of an adhesive, a fastener, or a combination thereof.

In some embodiments, the at least one insert comprises a first insert and a second insert, wherein the first insert defines at least a portion of a tool path extending from an outer surface of the first body component to the patient-specific surface of the second body component and the second insert is encapsulated within the first body component.

In some embodiments, the first body component defines at least one alignment hole sized and configured to receive an alignment element therein.

In some embodiments, the first body component includes a plastic material and the at least one insert includes a metal material.

In some embodiments, the first body component is formed by an injection molding process and the second body component is formed by a 3D printing process.

In some embodiments, a surgical device includes a first body component including at least one first insert embedded and at least one second insert embedded therein. The first body component comprises a first material and each of the at least one first insert and the at least one second insert comprises a second material. The surgical device includes a second body component including a patient-specific surface having a topography complimentary to an imaged joint. The second body component is configured to be coupled to the first body component. The at least one first insert defines at least a portion of a tool path extending from an outer surface of the first body component to the patient-specific surface of the second body component and the at least one second insert is encapsulated within the first body component.

In some embodiments, the at least one first insert comprises one of a drill guide or a cutting guide.

In some embodiments, the at least one second insert comprises a radiopaque alignment element.

In some embodiments, the first body component defines a first planar surface and the second body component defines a second planar surface. The first planar surface is configured to abut the second planar surface when the first body component is coupled to the second body component.

In some embodiments, the first body component includes at least one coupling element extending from the first planar surface and the second body component defines at least one opening in the second planar surface sized and configured to receive the at least one coupling element therein.

In some embodiments, the first body component is coupled to the second body component by one of an adhesive, a fastener, or a combination thereof.

In some embodiments, the first body component includes a plastic material and each of the at least one first insert and the at least one second insert includes a metal material. The first body component is formed by an injection molding process and the second body component is formed by a 3D printing process.

In some embodiments, a surgical device includes a first body component including at least one insert embedded therein. The first body component comprises a first material and the at least one insert comprises a second material. The first body component defines at least one first hole. The first body component includes a plastic material and the at least one insert includes a metal material. The surgical device includes a second body component including a patient-specific surface having a topography complimentary to an imaged joint. The second body component defines at least one second hole. The second body component is configured to be coupled to the first body component. The at least one first hole and the at least one second hole are aligned when the first body component is coupled to the second body component to define at least one continuous fixation hole sized and configured to receive an elongate fixation device at a predetermined location. The first body component is formed by an injection molding process and the second body component is formed by a 3D printing process.

Although the subject matter has been described in terms of exemplary embodiments, it is not limited thereto. Rather, the appended claims should be construed broadly, to include other variants and embodiments, which may be made by those skilled in the art.

What is claimed is:

1. A surgical device, comprising:
a first body component including at least one insert embedded therein and a pair of arms that extend away from a base disposed between the pair of arms, the base including an outwardly extending tab between the pair of arms that extends in a same direction as the pair of arms, the outwardly extending tab defining one or more holes therethrough configured to receive a pin or a k-wire, wherein the first body component comprises a first material and the at least one insert comprises a second material, wherein the first body component defines at least one first hole;
a second body component including a patient-specific surface, wherein the second body component defines at least one second hole, and wherein the second body component is configured to be coupled to the first body component;
wherein the at least one first hole and the at least one second hole are aligned when the first body component is coupled to the second body component to define at least one continuous fixation hole sized and configured to receive an elongate fixation device at a predetermined location; and
wherein the at least one insert comprises at least one first insert and at least one second insert, the at least one first insert defining at least a portion of a tool path extending from an outer surface of the first body component to the patient-specific surface of the second body component and the at least one second insert is sandwiched between the first body component and the second body component.

2. The surgical device of claim 1, wherein the at least one first insert comprises one of a drill guide or a cutting guide.

3. The surgical device of claim 1, wherein the at least one second insert comprises a radiopaque alignment element.

4. The surgical device of claim 1, wherein the first body component defines a first planar surface and the second body component defines a second planar surface, and wherein the first planar surface is configured to abut the second planar surface when the first body component is coupled to the second body component.

5. The surgical device of claim 4, wherein the first body component comprises at least one coupling element extending from the first planar surface, and wherein the second body component defines at least one opening in the second planar surface sized and configured to receive the at least one coupling element therein.

6. The surgical device of claim 1, wherein the first body component is coupled to the second body component by one of an adhesive, a fastener, or a combination thereof.

7. The surgical device of claim 1, wherein the first body component defines at least one alignment hole sized and configured to receive an alignment element therein.

8. The surgical device of claim 1, wherein the first body component comprises a plastic material and the at least one first insert comprises a metal material.

9. The surgical device of claim 1, wherein the first body component is formed by an injection molding process and the second body component is formed by a 3D printing process.

10. A surgical device, comprising:
a first body component including at least one first insert embedded therein and at least one second insert embedded therein, the first body component having a pair of arms that extend away from a base disposed between the pair of arms, the base including an outwardly extending tab between the pair of arms that extends in a same direction as the pair of arms, the outwardly extending tab defining one or more holes therethrough configured to receive a pin or a k-wire, wherein the first body component comprises a first material and each of the at least one first insert and the at least one second insert comprises a second material;
a second body component including a patient-specific surface, wherein the second body component is configured to be coupled to the first body component; and
wherein the at least one first insert defines at least a portion of a tool path extending from an outer surface of the first body component to the patient-specific surface of the second body component and the at least one second insert is sandwiched between the first body component and the second body component.

11. The surgical device of claim 10, wherein the at least one first insert comprises one of a drill guide or a cutting guide.

12. The surgical device of claim 10, wherein the at least one second insert comprises a radiopaque alignment element.

13. The surgical device of claim 10, wherein the first body component defines a first planar surface and the second body component defines a second planar surface, and wherein the first planar surface is configured to abut the second planar surface when the first body component is coupled to the second body component.

14. The surgical device of claim 13, wherein the first body component comprises at least one coupling element extending from the first planar surface, and wherein the second body component defines at least one opening in the second planar surface sized and configured to receive the at least one coupling element therein.

15. The surgical device of claim 10, wherein the first body component is coupled to the second body component by one of an adhesive, a fastener, or a combination thereof.

16. The surgical device of claim 10, wherein the first body component comprises a plastic material and each of the at least one first insert and the at least one second insert comprises a metal material, and wherein the first body component is formed by an injection molding process and the second body component is formed by a 3D printing process.

17. A surgical device, comprising:
  a first body component including at least one insert embedded therein and a pair of arms that extend away from a base disposed between the pair of arms, the base including an outwardly extending tab between the pair of arms that extends in a same direction as the pair of arms, the outwardly extending tab defining one or more holes therethrough configured to receive a pin or k-wire, wherein the first body component comprises a plastic material and the at least one insert comprises a metal material, wherein the first body component defines at least one first hole;

a second body component including a patient-specific surface, wherein the second body component defines at least one second hole, and wherein the second body component is configured to be coupled to the first body component;

wherein the at least one insert comprises a first insert and a second insert, the first insert defining at least a portion of a tool path extending from an outer surface of the first body component to the patient-specific surface of the second body component and the second insert is sandwiched between the first body component and the second body component; and wherein the at least one first hole and the at least one second hole are aligned when the first body component is coupled to the second body component to define at least one continuous fixation hole sized and configured to receive an elongate fixation device at a predetermined location, and wherein the first body component is formed by an injection molding process and the second body component is formed by a 3D printing process.

* * * * *